United States Patent [19]

Cook

[11] 4,388,856

[45] Jun. 21, 1983

[54] IDLE SPEED CONTROL ACTUATOR

[75] Inventor: John E. Cook, Chatham, Canada

[73] Assignee: Canadian Fram Limited, Canada

[21] Appl. No.: 211,617

[22] Filed: Dec. 1, 1980

[51] Int. Cl.[3] ......................... F15B 9/10; F01B 19/00; F16J 3/02

[52] U.S. Cl. ..................................... 91/49; 91/376 R; 92/13.6; 92/94; 92/99

[58] Field of Search ........................ 91/49, 416, 47, 52, 91/376 R; 92/94, 99

[56] References Cited

U.S. PATENT DOCUMENTS 3,448,659 6/1969 Beatenbough et al. ................. 91/49
3,502,000 3/1970 Voges et al. ............................ 91/47
4,189,981 2/1980 Ludwig .................................. 91/52

*Primary Examiner*—Paul E. Maslousky
*Attorney, Agent, or Firm*—Markell Seitzman; Russel C. Wells

[57] ABSTRACT

An idle control valve (10) for adjusting the idle position of a vehicle throttle lever includes a housing (12) having a pair of diaphragm assemblies (18, 20) which divide the housing into three chambers (22, 24, 26). The chamber (26) defined between the diaphragm assemblies is communicated with atmospheric pressure, and the other chambers (22, 24) are communicated with engine manifold vacuum. A valve member (38) controls communication through a vent (74) in the diaphragm assembly (20) to position the latter as a function of the variations in engine manifold vacuum to thereby control the position of the plunger (62) which is attached to the diaphragm assembly (20). The diaphragm assemblies (18, 20) include projecting portions (36, 52) which telescope within one another when the vehicle engine is turned off and atmospheric pressure is communicated to all three chambers to permit the plunger to be withdrawn into the housing.

14 Claims, 1 Drawing Figure

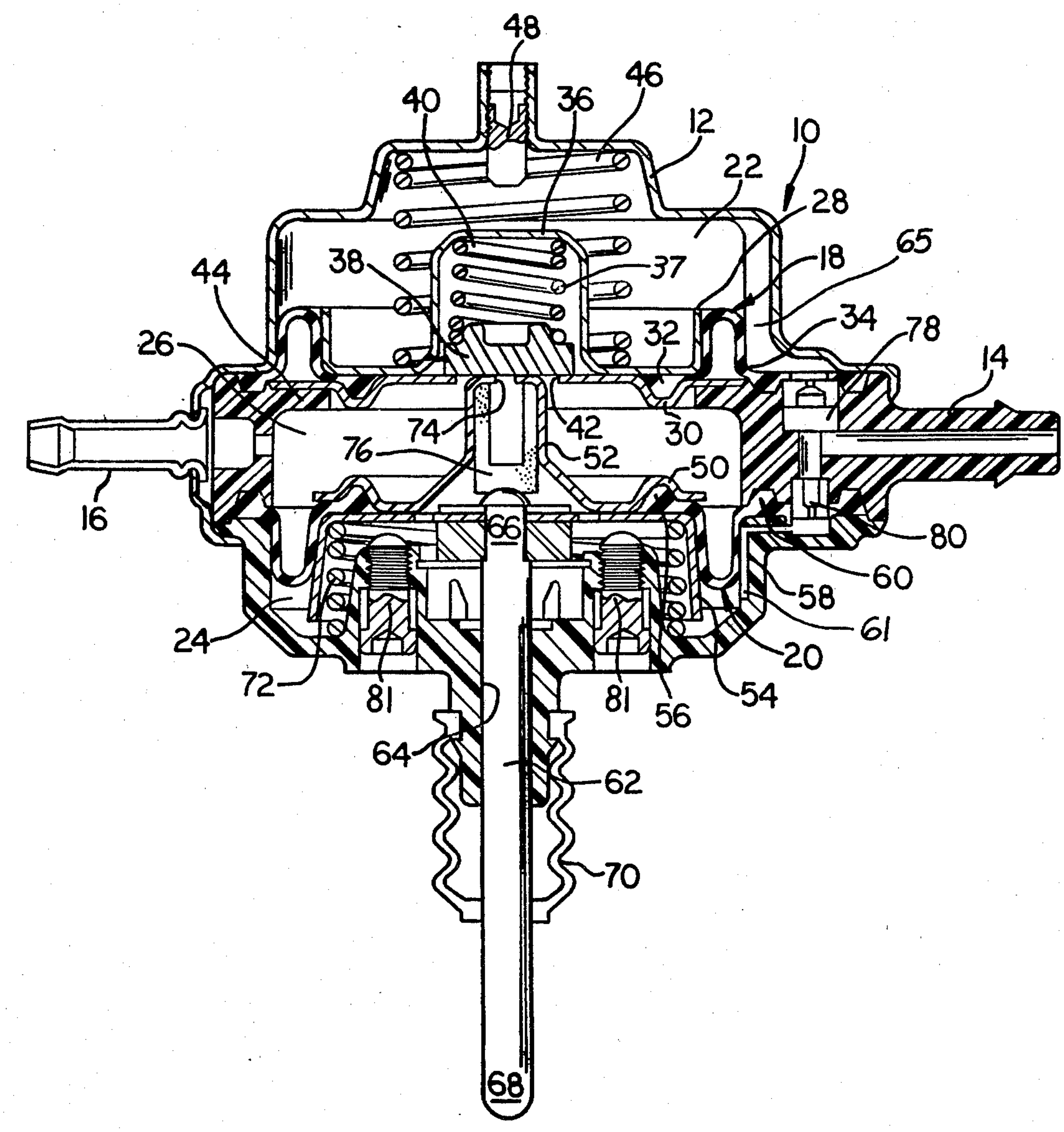
48
46
40
36
12
10
22
28
65
18
37
38
44
34
78
32
26
14
74
42
30
76
52
50
16
66
80
60
58
61
24
20
72
81
81
56
54
64
62
70
68

IDLE SPEED CONTROL ACTUATOR

This invention relates to a vacuum actuator for controlling the idle position of the throttle lever in a motor vehicle.

Modern automotive vehicles usually must maintain very low engine idle speeds in order to insure proper control of vehicle engine emissions. However, when vehicle accessories are switched on, engines idling at a relatively low speed may stall. Accordingly, it is necessary to provide an actuator which sets the engine idle speed as a function of the load on the engine. Actuators of this type have been proposed before. These actuators include a vacuum actuator which is responsive to engine manifold vacuum and which sets a plunger in a predetermined position as a function of the engine manifold vacuum. The plunger acts as a stop for the engine throttle lever. It is desirable to make the vacuum actuator relatively insensitive to external loads so that such variables as temperature and the strength of the throttle return springs will not affect the operation of the controller.

The prior art devices include vacuum actuators comprising a housing, a control diaphragm and an actuating diaphragm dividing the housing into a first chamber between the control diaphragm and one end of the housing, a second chamber between the actuating diaphragm and the other end of the housing, and a third chamber between the diaphragms, and further include vacuum communicating means for communicating vacuum into the first and second chambers, ambient air communicating means for communicating ambient air into the third chamber, passage means for communicating the second and third chambers, and control means controlled by the control diaphragm to control communication through the passage means, the plunger extending from the housing being positioned in an actuating range between first and second actuated positions as a function of the vacuum level communicated to the actuator.

Such a prior art vacuum actuator is exemplified by that disclosed in U.S. Pat. No. 3,448,659 to Beatenbough et al, in which a vacuum actuator includes a plunger which is secured to a member operated by the actuator, and which is also relatively insensitive to the magnitude of the forces exerted on the plunger. However, the Beatenbough et al device has drawbacks when used as a vehicle idle control actuator, since it is desirable to fully retract the plunger of an idle control actuator when the vehicle engine is turned off. Accordingly, when the vehicle engine is turned off, the plunger is withdrawn to cause the throttle lever to return to the fully off position so that dieseling or engine runon is avoided.

The invention described herein avoids the drawbacks of the prior art by providing for withdrawal of the actuating plunger to a fully retracted position when vacuum is not available to the device. Accordingly, the device disclosed in the present invention has the advantage of preventing engine dieseling or runon when the vehicle ignition is turned off, while setting an idle speed as a function of the engine load when the vehicle engine is running.

Other features and advantages of the invention will become apparent in the following description with reference to the accompanying drawing.

The sole FIGURE is a longitudinal cross-sectional view of a vacuum actuator incorporating the teachings of the present invention.

Referring now in detail to the drawing, the actuator generally indicated by the numeral 10 includes a housing 12 having an inlet 14 which is connected to engine manifold vacuum and another inlet 16 which is communicated to atmospheric pressure. A control diaphragm assembly generally indicated by the numeral 18 and an actuating diaphragm assembly generally indicated by the numeral 20 are mounted within the housing 12 and divide the latter into a first chamber 22 between the assembly 18 and the upper (viewing the FIGURE) end of the housing 12, a second chamber 24 between the assembly 20 and the lower (viewing the FIGURE) end of the housing 12, and a third chamber 26 between the diaphragm assemblies 18 and 20.

The control diaphragm assembly 18 includes an upper diaphragm plate 28 and a lower diaphragm plate 30. Diaphragm plates 28 and 30 clamp a circumferentially extending bead 32 of a circumferentially extending flexible member 34 which interconnects the diaphragm assembly 18 with the wall of the housing 12. The upper diaphragm plate 28 includes an axially projecting portion 36 defining a cavity 37 which slidably receives a valve member 38. The valve member 38 is urged into engagement with the lower diaphragm plate 30 by a spring 40. The lower diaphragm plate 30 defines an aperture 42 of slightly smaller diameter than the diameter of the valve member 38. The diaphragm assembly 18 is yieldably urged as a unit by a spring 46 toward a radially projecting stop 44 extending from the wall of the housing 12. Upward movement of the diaphragm assembly 18 is limited by engagement of the projecting portion 36 with an adjusting screw 48 installed in the wall of the housing 12.

The diaphragm assembly 20 includes an upper diaphragm plate 50 which includes a projecting portion 52 which projects toward the control diaphragm assembly 18. Diaphragm assembly 20 further includes a lower diaphragm plate 54 which cooperates with the upper plate 50 to clamp a circumferentially extending bead 56 of an annular flexible member 58. The annular flexible member 58 further includes another circumferentially extending bead 60 which is secured to the wall of the housing 12. A plunger 62 is slidably mounted in a bore 64 defined in the wall of housing 12. One end 66 of the plunger 62 is secured to the lower diaphragm plate 54 of the diaphragm assembly 20 and is movable therewith. The other end 68 of the plunger 62 projects from the housing 12 and is adapted to engage the throttle lever of the vehicle engine to thereby act as a stop limiting retraction of the throttle lever when the throttle return spring (not shown) moves the throttle lever to the idle position. A sealing boot 70 is provided to protect the bore 64 from entry of environmental contaminants. A spring 72 urges the diaphragm assembly 20, and therefore the plunger 62, upwardly viewing the FIGURE toward the control diaphragm assembly 18. As will be described in detail hereinafter, movement of the plunger 62 is controlled by controlling fluid communication through an orifice 74 which extends through the projecting portion 52 and communicates the section 26 with the section 24. A filter 76 is located within the projecting portion 52 to filter the atmospheric air communicated into the chamber 26 when the latter is communicated into the section 24. As discussed hereinabove, atmospheric air is communicated into the section or chamber 26 through the inlet orifice 16, and engine manifold vacuum is communicated into the sections 22 and 24 through the inlet 14 and appropriate control orifices 78, 80.

MODE OF OPERATION

Referring to the drawing, the various components are illustrated in the position which they assume when the vehicle engine is heavily loaded and, accordingly, the engine manifold vacuum level is relatively low, i.e., is quite close to atmospheric pressure. In this condition, the plunger 62 is extended from the housing 12 to its maximum extent (controlled by adjustable stop 81), to thereby limit movement of the aforementioned throttle control lever (not shown). If the load on the engine is reduced, the vacuum communicated into the chambers 22 and 24 will be increased, thereby causing the control diaphragm assembly 18 to move upwardly viewing the FIGURE, against the bias of the spring 46. When this occurs, of course, the valve member 38 moves away from the orifice 74, thereby permitting ambient atmospheric air in the chamber 26 to communicate through the orifice 74 and filter 76 into the chamber 24, thereby reducing the vacuum level therein to permit the spring 72 to urge the diaphragm assembly 20 upwardly viewing the FIGURE. Therefore, the plunger 62 moves into the housing 12, to thereby permit the throttle lever to move to a position further closing the butterfly valve in the engine carburetor to set a lower idle speed than would otherwise occur with a similar load on the vehicle engine. Assuming a constant manifold vacuum, the diaphragm assembly 20 will move into position so that the orifice 74 cooperates with the valve member 38 to define a bleed orifice therebetween, thereby permitting just enough ambient atmospheric pressure to communicate into the chamber 24 so that the diaphragm assembly 20 remains in a steady state position.

If the load on the engine is subsequently increased, thereby reducing the engine manifold vacuum to a value closer to atmospheric pressure, the vacuum level in chamber 22 will be similarly reduced to decrease the pressure differential across the diaphragm assembly 18, thereby permitting the spring 46 to move the diaphragm assembly 18 toward the stop 44. When this occurs, of course, the valve member 38, which can be moved upwardly viewing the FIGURE within the projecting portion 36, sealingly engages the orifice 74 to close off communication between the chambers 26 and 24. When this occurs, of course, the pressure differential across the diaphragm assembly 20 increases due to the fact that the atmospheric bleed through the orifice 74 is shut off. Accordingly, the diaphragm assembly 20 is sucked downwardly viewing the FIGURE in opposition to the spring 72 (and also in opposition to the aforementioned throttle return springs, which are not shown in the drawing, but which also tend to force the plunger 62 upwardly viewing the FIGURE). Accordingly, the plunger 62 is forced out of the housing 12, to thereby stop the throttle lever at an idle position which represents a larger opening in the carburetor butterfly valve (not shown). As discussed hereinabove, the relative positions of the diaphragm assemblies 18 and 20 will reach a steady state position for the new level of engine manifold vacuum such that the orifice 74 cooperates with the position of the diaphragm assembly 20 for a given manifold vacuum level. Consequently, the idle position of the vehicle engine is set at a relatively small butterfly valve opening when the engine is lightly loaded and thereby generates a relatively high vacuum level, because in this condition the engine will idle properly at a small butterfly valve opening. Conversely, when the engine load is increased, thereby reducing the engine manifold vacuum level, the plunger 62 sets an idle butterfly valve opening that is somewhat greater, because the increased fuel flow is necessary to prevent the engine from stalling at these higher loading conditions.

It will also be noted that the actuating diaphragm assembly 20 follows the control diaphragm assembly 18, but does not exert any load upon it. Accordingly, the control diaphragm assembly 18 is responsive solely to engine manifold vacuum, and is not affected by the force on the plunger 62, since there is no direct connection between the plunger and the diaphragm assembly 18. Accordingly, the actuating diaphragm assembly 20 acts as a fluid motor, communication across which is controlled by the orifice 74 and valve member 38. Therefore, the engine idle speed as set by the idle controller will be a function of the engine manifold vacuum, and will not be affected by such variables, as changes in engine drag or friction, the strength of the throttle return springs (which have a tendency to weaken over time), and other operating variables.

When the vehicle engine is turned off, it is necessary to close the butterfly valve of a carburetor so that the engine dieseling or run-on is prevented. Accordingly, the size of the opening 42 is made large enough to accommodate the projecting portion 52 of the diaphragm assembly 20, and the stop 44 limits downward movement of the diaphragm assembly 18. Therefore, when the engine is turned off and all of the chambers 22, 26 and 24 are brought to atmospheric pressures, so that the pressure differentials across the diaphragm assemblies 18 and 20 are zero, the spring 46 urges the diaphragm assembly 18 into engagement with the stop 44, and the spring 72 urges the diaphragm assembly upwardly viewing the FIGURE the above-noted pressure equalization is accomplished as follows: when the engine is turned off the manifold vacuum normally communicated to the inlet is returned to atmospheric pressure through communication via the orifices 78 and 80 to the chambers 22 and 24 respectively. It should be recalled that chamber 26 is normally communicated to atmospheric pressure by the inlet 16. The communication from the orifices 78 and 80 to the chambers 22 and 24 requires passages therebetween. These passages can be provided using any of a number of known structures such as providing grooves or slots in the various sections of the housing 12 or diaphragm assemblies 18 or 20. As an example the wall of the lower portion housing 12 may be provided with a vertically extending passage 61, thereby communicating the orifice 80 with chamber 24. A passage 65 may be formed by providing the upper section of the housing 12 with a protruding contour thereby providing communication between orifice 78 and chamber 22. Because the opening 42 is large enough to accommodate the projecting portion 52, the projecting portion 52 raises the valve member 38 off the lower diaphragm plate 30 to permit the diaphragm assembly 20 to move upwardly viewing the FIGURE as the projecting portion 52 is forced into the projecting portion 36. This is possible, of course, because the spring 40 is much weaker than is the spring 72. Accordingly, the plunger 62 is withdrawn from the actuating range established by the diaphragm assembly 20 when the engine is operating to a fully retracted position in which the upper plate of the diaphragm assembly 20 engages the lower plate 30 of the diaphragm assembly 18 and the projecting portion 52 is fully received within the projecting portion 36.

I claim:

1. In a vacuum actuator, a plunger and an actuating assembly for actuating said plunger, said actuating assembly comprising a housing, a control diaphragm and an actuating diaphragm dividing said housing into a first chamber between the control diaphragm and one end of the housing, a second chamber between the actuating diaphragm and the other end of the housing, and a third chamber between said diaphragms, vacuum communicating means for communicating vacuum into said first and second chambers, ambient air communicating means for communicating ambient air into said third chamber, passage means for communicating said second and third chambers, air control means controlled by said control diaphragm to control communication through said passage means, said plunger extending from said housing and being positioned by said actuating assembly in an actuating range between first and second actuated positions as a function of the level of the vacuum communicated into said actuating assembly, characterized in that said actuating assembly includes means for withdrawing said plunger to a retracted position when vacuum is not available to said vacuum communicating means.

2. The vacuum actuator as claimed in claim 1, and further characterized in that said plunger withdrawing means includes a stop for said control diaphragm, said stop being located between the ends of the housing, and resilient means yieldably urging said control diaphragm toward said stop, and means urging said plunger toward said control diaphragm.

3. The vacuum actuator as claimed in claim 1, and further characterized in that said passage means is a vent extending through said actuating diaphragm, said control diaphragm carrying a deflectable valve member controlling communication through said vent but deflecting to permit said actuating diaphragm to engage said control diaphragm when vacuum is not available to said vacuum communicating means.

4. The vacuum actuator as claimed in claim 3, and further characterized in that said plunger withdrawing means includes a projecting portion on said control diaphragm defining a cavity having an open end facing said actuating diaphragm, said actuting diaphragm having a projecting portion carrying said vent, a valve member slidable in said cavity and cooperating with the actuating diaphragm to control communication through said vent, said cavity slidably receiving the projecting portion of said actuating diaphragm when the plunger is moved to its retracted position.

5. The vacuum actuator as claimed in claim 4, and further characterized in that said cavity is provided with limit means adjacent the open end thereof, said limit means defining an opening receiving the projecting portion of the actuating diaphragm when the plunger is moved to the retracted position, a spring yieldably urging said valve member into engagement with said stop, said projecting portion moving out of said cavity when the plunger moves into said actuating range to permit said spring to urge said valve member against said limit means, said actuating diaphragm and said control diaphragm moving the vent and the valve member toward and away from sealing engagement with one another when the valve member engages said limit means to thereby control fluid communication through said vent to position said plunger within said actuating range, said resilient means and said plunger urging means cooperating to urge said diaphragms into engagement with one another when vacuum is not communicated into said first and second chambers to permit the projecting portion to move into said cavity and force the valve member away from said limit means.

6. The vacuum actuator as claimed in claim 4, and further characterized in that said plunger withdrawing means includes a stop for said control diaphragm, located between the ends of the housing, and resilient means yieldably urging said control diaphragm toward said stop, and means urging said plunger toward said control diaphragm.

7. The vacuum actuator as claimed in claim 1, and further characterized in that said plunger withdrawing means includes resilient means urging said control diaphragm toward a predetermined position in said housing and means urging said actuating diaphragm toward the control diaphragm, said retracted position being defined by engagement of the actuating diaphragm with the control diaphragm when the latter is disposed in the predetermined position.

8. The vacuum actuator as claimed in claim 7, and further characterized in that said predetermined position of said control diaphragm is established by engagement of the latter with a stop carried by said housing and located between the ends thereof.

9. The vacuum actuator as claimed in claim 7, and further characterized in that one of said diaphragms includes a portion received within a cavity defined by a corresponding portion of the other diaphragm when the plunger is moved to the retracted position but which moves out of said cavity and cooperates with the control diaphragm to control communication through the passage means when the plunger is moved into said actuating range.

10. The vacuum actuator as claimed in claim 9 and further characterized in that said other diaphragm includes a valve element movable relative to said one diaphragm.

11. A vacuum actuator for controlling the idle position of the throttle lever in a vehicle engine, comprising a housing, a control diaphragm assembly and an actuating diaphragm assembly arranged within said housing and dividing same into a first chamber between the control diaphragm assembly and one end of the housing, a second chamber between the actuating diaphragm assembly and the other end of the housing, and a third chamber between said diaphragm assemblies, said first and second chambers being communicated with vacuum whereas said third chamber is communicated with atmospheric air, passage means for establishing communication between the second and third chambers said communication being controlled by the control diaphragm assembly, and a plunger extending from the housing and connected to the actuating diaphragm assembly for being positioned by the latter in an actuating range as a function of the level of vacuum communicated into said actuator, characterized in that it further includes means for withdrawing the plunger from said actuating range to a fully retracted position when vacuum is no longer available.

12. A vacuum actuator according to claim 11, characterized in that the plunger withdrawing means includes a stop for limiting movement of the control diaphragm assembly to a position intermediate the ends of the housing, first resilient means for urging said control diaphragm assembly against said stop in the absence of vacuum within the first chamber second resilient means for urging the plunger and actuating diaphragm assembly toward the control diaphragm assembly in the absence of vacuum within the second chamber, and retractable abutment means carried by at least one of said assemblies for permitting the actuating diaphragm assembly to move toward and come into engagement with the control diaphragm assembly, thus defining the fully retracted position of the plunger.

13. A vacuum actuator according to claim 12, characterized in that the passage means comprises a vent formed in a projecting portion of the actuating diaphragm assembly, in that the plunger withdrawing means further includes a corresponding projecting portion in the control diaphragm assembly defining a cavity with an open end into which can be slidably received in the first-named projecting portion upon the plunger being moved to its retracted position, and in that the retractable abutment means comprises a valve member slidable in said cavity and cooperating with said vent for controlling communication between the second and third chambers.

14. A vacuum actuator according to claim 13, characterized in that a cavity is provided with limit means adjacent the open end thereof, said limit means defining an opening receiving the projecting portion of the actuating diaphragm assembly when the plunger is moved to is retracted position, a spring yieldably urging said valve member into engagement with said limit means, said projecting portion moving out of said cavity when the plunger moves into its actuating range to permit said spring to urge said valve member against said limit means, said actuating diaphragm and said control diaphragm assemblies then moving the vent and the valve member toward and away from sealing engagement with one another when the valve member engages said limit means to thereby control communication through said vent, and said spring permitting retraction of said valve member away from said limit means when the plunger moves again to its retracted position as a result of vacuum being absent within the first and second chambers.

* * * * *